United States Patent
Hill

(10) Patent No.: US 11,823,545 B2
(45) Date of Patent: Nov. 21, 2023

(54) THREAT DETECTION AND ISOLATION SYSTEM

(71) Applicant: Lionel Hill, Baltimore, MD (US)

(72) Inventor: Lionel Hill, Baltimore, MD (US)

(*) Notice: Subject to any disclaimer, the term of this patent is extended or adjusted under 35 U.S.C. 154(b) by 92 days.

(21) Appl. No.: 17/109,368

(22) Filed: Dec. 2, 2020

(65) Prior Publication Data
US 2021/0166538 A1 Jun. 3, 2021

Related U.S. Application Data

(60) Provisional application No. 62/942,782, filed on Dec. 3, 2019.

(51) Int. Cl.
| | |
|---|---|
| G08B 15/00 | (2006.01) |
| G08B 3/10 | (2006.01) |
| G07C 9/00 | (2020.01) |
| G08B 5/36 | (2006.01) |
| G06V 20/52 | (2022.01) |
| G08B 21/00 | (2006.01) |

(52) U.S. Cl.
CPC ........... G08B 15/007 (2013.01); G06V 20/52 (2022.01); G07C 9/00896 (2013.01); G08B 3/10 (2013.01); G08B 5/36 (2013.01); *G06V 2201/05* (2022.01); *G08B 21/00* (2013.01)

(58) Field of Classification Search
CPC .......... G08B 15/007; G08B 3/10; G08B 5/36; G08B 21/00; G06V 20/52; G06V 2201/05; G07C 9/00896; G07C 9/00904; G07C 9/00174; G07C 9/0069; E05G 5/02
See application file for complete search history.

(56) References Cited

U.S. PATENT DOCUMENTS

| | | | |
|---|---|---|---|
| 4,060,039 A * | 11/1977 | Lagarrigue | G01V 3/10 109/3 |
| 6,308,644 B1 * | 10/2001 | Diaz | E05G 5/003 109/6 |
| 6,720,905 B2 | 4/2004 | Levitan et al. | |
| 7,768,444 B1 | 8/2010 | Rourk | |
| 8,378,988 B1 * | 2/2013 | Artino | G07C 9/30 235/382 |
| 9,506,709 B2 | 11/2016 | Esposito et al. | |
| 10,157,537 B1 * | 12/2018 | Coxwell | G07C 9/00563 |
| 10,229,328 B2 | 3/2019 | Nikolova et al. | |

(Continued)

*Primary Examiner* — Brian Wilson
(74) *Attorney, Agent, or Firm* — Brennan, Manna & Diamond, LLC

(57) ABSTRACT

A threat detection and isolation system is provided. The system includes a housing having an upper wall and a plurality of sidewalls extending therefrom defining an interior volume. A door is affixed to the housing on at least one of the plurality of sidewalls, the door providing access to the interior volume. A camera is disposed within the housing. At least one sensor is disposed within the housing, wherein the sensor can detect the presence of a predefined dangerous object within the interior volume. Upon detection of the presence of the predefined dangerous object, the door moves to a closed position and a lock engages the door, thereby preventing the door from moving to an open position. In some embodiments, a notification is sent to emergency services via a wireless communication system upon actuation of the sensor.

14 Claims, 3 Drawing Sheets

(56) References Cited

U.S. PATENT DOCUMENTS

| | | | |
|---|---|---|---|
| 2002/0154012 A1* | 10/2002 | Risi | E05F 15/632 |
| | | | 340/541 |
| 2015/0310713 A1* | 10/2015 | Kellermann | G08B 15/007 |
| | | | 340/541 |
| 2016/0019427 A1 | 1/2016 | Martin et al. | |
| 2017/0098357 A1* | 4/2017 | Hoy | G08B 15/007 |
| 2021/0140220 A1* | 5/2021 | Buchanan | E05F 15/77 |

* cited by examiner

THREAT DETECTION AND ISOLATION SYSTEM

CROSS REFERENCE TO RELATED APPLICATIONS

This application claims the benefit of U.S. Provisional Application No. 62/942,782 filed on Dec. 3, 2019. The above identified patent application is herein incorporated by reference in its entirety to provide continuity of disclosure.

BACKGROUND OF THE INVENTION

The present invention relates to threat detection and isolation systems. More particularly, the present invention pertains to a threat detection and isolation system integrated into the entrance of a building and configured to lock an individual within a confined space upon detection of a dangerous object.

Many public places, including schools, airports, banks, sporting arenas, and other locations have been the sites of extreme violence, such as mass shootings, robberies, and the like. As time goes on, it only appears to be increasing in frequency. Preventing such violent events can be particularly difficult, as constant monitoring and screening of every individual that enters a public place is extremely taxing. Often, a combination of manpower and screening tools must be present at entrances and frequently traveled areas to monitor and prevent individuals from bringing firearms, explosives, or other dangerous objects into a public space. Failure to properly secure a public location can result in significant injury or loss of life. Therefore, a device that can automatically detain an individual safely upon detection of a dangerous object is desired.

In light of the devices disclosed in the known art, it is submitted that the present invention substantially diverges in design elements from the known art and consequently it is clear that there is a need in the art for an improvement to existing threat detection systems. In this regard, the instant invention substantially fulfills these needs.

SUMMARY OF THE INVENTION

In view of the foregoing disadvantages inherent in the known types of threat detection systems now present in the known art, the present invention provides a threat detection system wherein the same can be utilized for providing convenience for the user when isolating a potentially dangerous individual upon a sensor detecting the presence of a dangerous object, such as a firearm.

The present system comprises a housing having an upper wall and a plurality of sidewalls extending therefrom defining an interior volume. A door is affixed to the housing on at least one of the plurality of sidewalls, the door providing access to the interior volume. A camera is disposed within the housing. At least one sensor is disposed within the housing, wherein the sensor is configured to detect the presence of a predefined dangerous object within the interior volume. Upon detection of the presence of the predefined dangerous object, the door is configured to move to a closed position and a lock is configured to engage the door, thereby preventing the door from moving to an open position. In some embodiments, upon actuation of the sensor, a notification is sent to emergency services via a wireless communications system disposed within the housing.

In some embodiments, a speaker is configured to emit an audible alert upon actuation of the sensor. In another embodiment, a light is disposed on an interior of the upper wall, the light configured to illuminate upon actuation of the sensor. In other embodiments, a keypad is disposed on an exterior of the housing, wherein the keypad is configured to disengage the lock upon entry of a code. In yet another embodiment, at least one sensor comprises a metal detector. In some embodiments, at least one sensor comprises a chemical sensor. In another embodiment, the housing comprises a bulletproof material. In other embodiments, a transfer compartment is disposed within the sidewall, wherein the transfer compartment includes an interior door and an exterior door providing access to an interior of the transfer compartment. In yet another embodiment, a sensor is disposed in each corner of the upper wall. In some embodiments, the housing comprises a transparent material.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
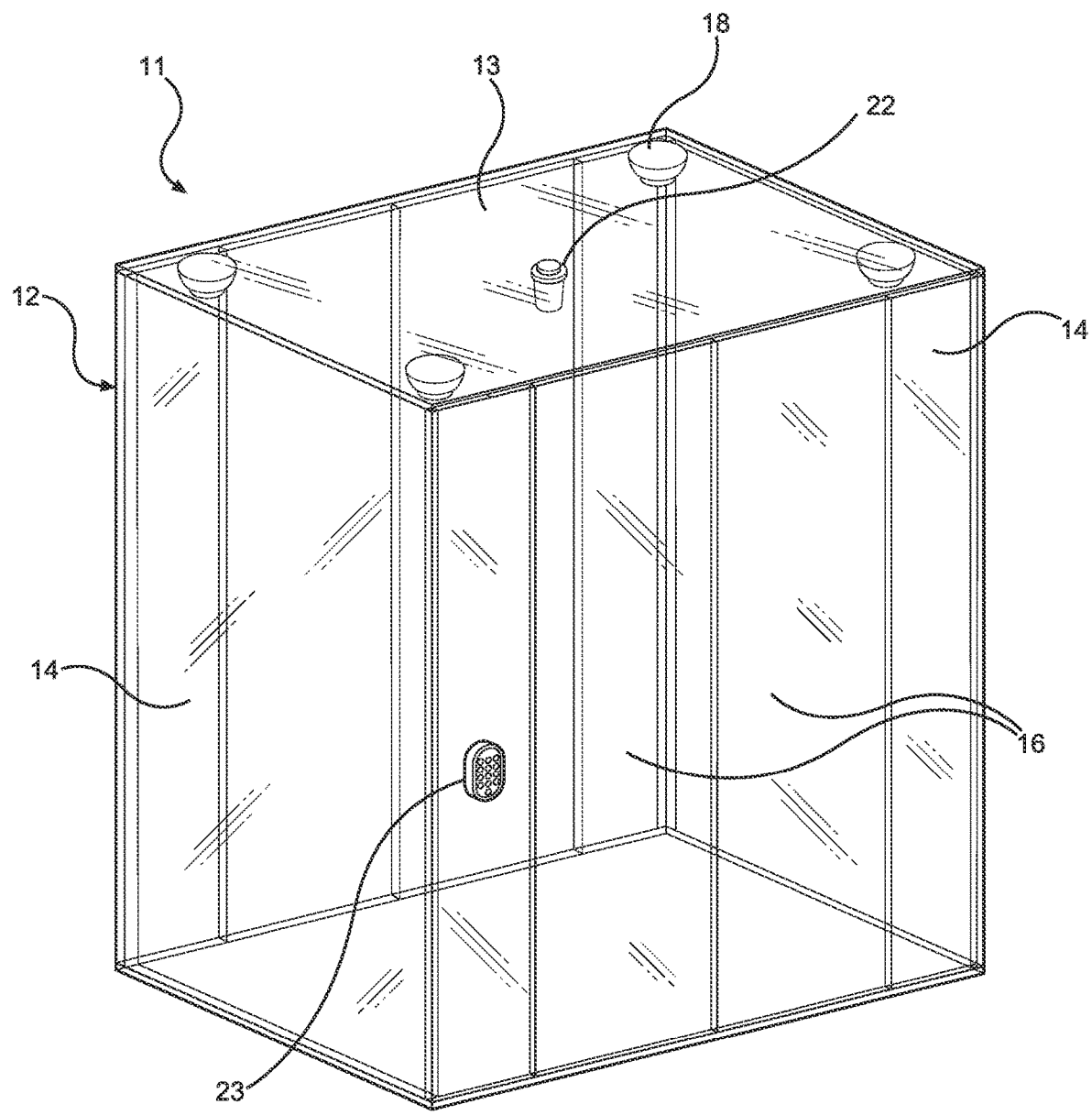
FIG. 1 shows a perspective view of an embodiment of the threat detection and isolation system.

Reference is made herein to the attached drawings. Like reference numerals are used throughout the drawings to depict like or similar elements of the threat detection and isolation system. The figures are intended for representative purposes only and should not be considered to be limiting in any respect.

Referring now to FIG. 1, there is shown a perspective view of an embodiment of the threat detection and isolation system. The threat detection and isolation system 11 comprises a housing 12 having at least an upper wall 13 and a plurality of sidewalls 14 extending from a perimeter of the upper wall 13, thereby defining an interior volume. In some embodiments, the housing 12 is further enclosed by a lower wall. In some embodiments, the housing 12 comprises a bulletproof material, such that an armed individual detained within the housing 12 cannot injure bystanders exterior to the housing 12. Furthermore, in the shown embodiment, the housing 12 comprises a transparent material allowing emergency responders, such as police, to visualize the individual detained within the housing 12.

A door 16 is disposed within at least one of the plurality of sidewalls 14, wherein the door 16 provides access to the interior volume. In the illustrated embodiment, the door 16 comprises a sliding door system including a pair of panels configured to selectively move between an open and closed position. In some embodiments, the door 16 automatically opens and closes upon detection of the presence of a user in the vicinity. In other embodiments, the door 16 comprises a revolving door system, pivoting door, or other such system suitable to blend into a façade of a building. In the shown embodiment, a secondary door 16 is disposed on an opposing sidewall of the plurality of sidewalls 14, thereby defining an enclosed vestibule providing access to an interior of a building. In such embodiments, the secondary door 16 is configured to remain in a closed position for a period of time after the door 16 is opened. In this manner, the user is prevented from entering the building the housing 12 is affixed to until the threat detection and isolation system 11 identifies that the user is not in the possession of a dangerous object.

At least one sensor 18 is disposed within the housing 12, wherein the sensor 18 is configured to detect the presence of a dangerous object within the interior volume of the housing 12. Upon detection of a dangerous object, the sensor 18 initiates several procedures elsewhere described herein. In some embodiments, the sensor 18 comprises a metal detector configured to detect the presence of firearms, knives, or the like. In alternate embodiments, the sensor 18 comprises a chemical sensor configured to detect the presence of dangerous chemicals, such as harmful aerosols, gasses, or off-gas emitted from common explosive compounds. In further embodiments, the sensor 18 comprises a suite of sensor mechanisms capable of detecting a wide range of dangerous objects. In the shown embodiment, the sensors 18 are disposed in each corner of the upper wall 13, such that a full 360-degree area within the housing 12 can be analyzed for dangerous objects. In further embodiments, a camera may be disposed within the sensor 18, the camera configured to record images or video of individuals located within the housing 12. In some embodiments, the camera is constantly active, however, in alternate embodiments, the camera is configured to initiate recording upon actuation of the sensor 18.

In the shown embodiment, a light 22 is disposed on the interior of the upper wall 13, wherein the light 22 is configured to illuminate upon actuation of the sensor 18. In this manner, any bystanders, security, or other personnel in the area are readily notified of the presence of a potentially dangerous object within the housing 12. Furthermore, upon actuation of the housing 12, a lock disposed within the door 16 is configured to engage, thereby preventing the door 16 from moving to an open position. In this manner, an individual is detained within the housing 12 until proper security measures can be implemented. In the illustrated embodiment, a keypad 23 is disposed on one of the plurality of sidewalls 14 adjacent to the door 16, wherein the keypad 23 is configured to disengage the lock upon verification of a code entered via the keypad 23. In this manner, emergency services personnel can unlock the door 16 to retrieve the detained individual once it is deemed safe to do so.

Figure 2:
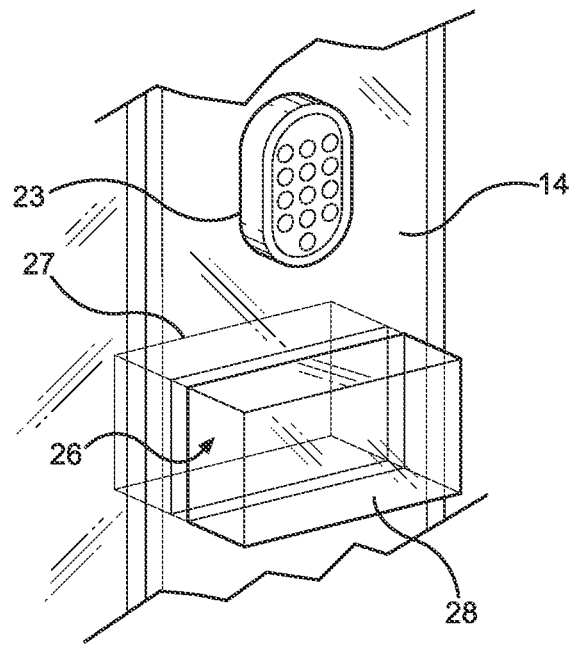
FIG. 2 shows a close-up view of the transfer compartment of an embodiment of the threat detection and isolation system.

Referring now to FIG. 2, there is shown a close-up view of the transfer compartment of an embodiment of the threat detection and isolation system. In the illustrated embodiment, the system further comprises a transfer compartment 26 disposed within one of the plurality of sidewalls 14, wherein the transfer compartment 26 is configured to provide limited access to the interior of the housing. The transfer compartment 26 comprises an interior door 27 opposite an exterior door 28, wherein the interior and exterior doors 27, 28 provide access to an interior of the transfer compartment 26. In some embodiments, the interior and exterior doors 27, 28 are pivotally affixed along a lower edge thereof to the sidewall 14 of the housing and are spring biased towards a closed position. The transfer compartment 26 allows an individual within the interior volume of the housing to deposit an item within the transfer compartment 26 to be retrieved via another individual exterior to the housing. In this manner, the detained individual can be disarmed to ensure that the area is safe for release of the detained individual. In the illustrated embodiment, the transfer compartment 26 is disposed adjacent to the keypad 23, however, in alternate embodiments, the transfer compartment 26 can be positioned elsewhere to minimize interference with the operation of various components of the system, such as the doors.

Figure 3:
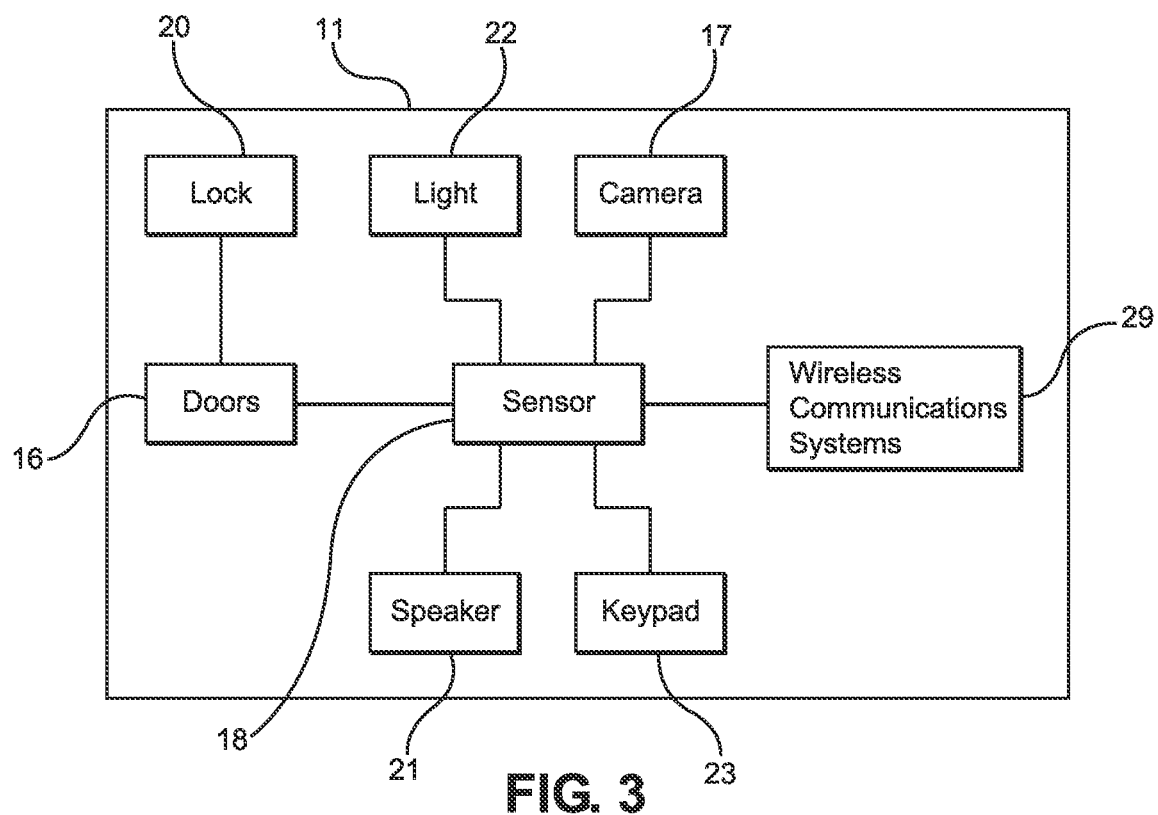
FIG. 3 shows a schematic view of an embodiment of the threat detection and isolation system.

Referring now to FIG. 3, there is shown a schematic view of an embodiment of the threat detection and isolation system. The sensor 18 of the threat detection and isolation system 11 is electrically connected to the doors 16, which are in turn electrically connected to a lock 20. Upon actuation of the sensor 18 via detection of the presence of a dangerous object, the doors 16 are configured to move to a closed position, ensuring that the individual and the dangerous objects are confined to the interior volume of the housing. The lock 20 is then configured to engage the doors 16, thereby preventing the doors 16 from moving to an open position. In this manner, the individual is detained safely within the housing until emergency services can be contacted to safely deescalate the situation. The keypad 23 is further operably connected to the lock 20, such that upon entry and verification of an associated code, the lock 20 can be disengaged, thereby allowing the doors 16 to open, releasing the detained individual.

Furthermore, in the illustrated embodiment, the system further comprises a speaker 21 operably connected to the sensor 18, wherein the speaker 21 is configured to emit an audible alert upon actuation of the sensor 18. In this manner, the bystanders in the vicinity of the housing is alerted that the system detected a potentially dangerous object and detained an individual. This can further alert security officers to investigate the situation. Similarly, in some embodiments, the light 22 is configured to illuminate upon actuation of the sensor 18, such that nearby individuals are visually alerted to the possibility of a dangerous object within the housing. In another embodiment, a camera 17 is electrically coupled to the sensor 18 as previously described, such that the camera 17 is activated when the sensor 18 detects the presence of a dangerous object, wherein the camera 17 is configured to record an image or video of the interior volume of the housing and the individual detained therein.

In the illustrated embodiment, a wireless communication system 29 is further connected to the sensor 18, such that upon actuation of the sensor 18, the wireless communication system 29 is configured to contact emergency services, such as police, medical professionals, or other first responders, to respond to the potential threat. For example, the wireless communication system 29 can be operably connected to a telecommunications network, allowing an alert to be sent directly to emergency services via existing telecommunications means. Alternatively, the wireless communication system 29 can be configured to operably connect to an external wireless network associated with emergency services to alert emergency services of a potential threat.

Figure 4:
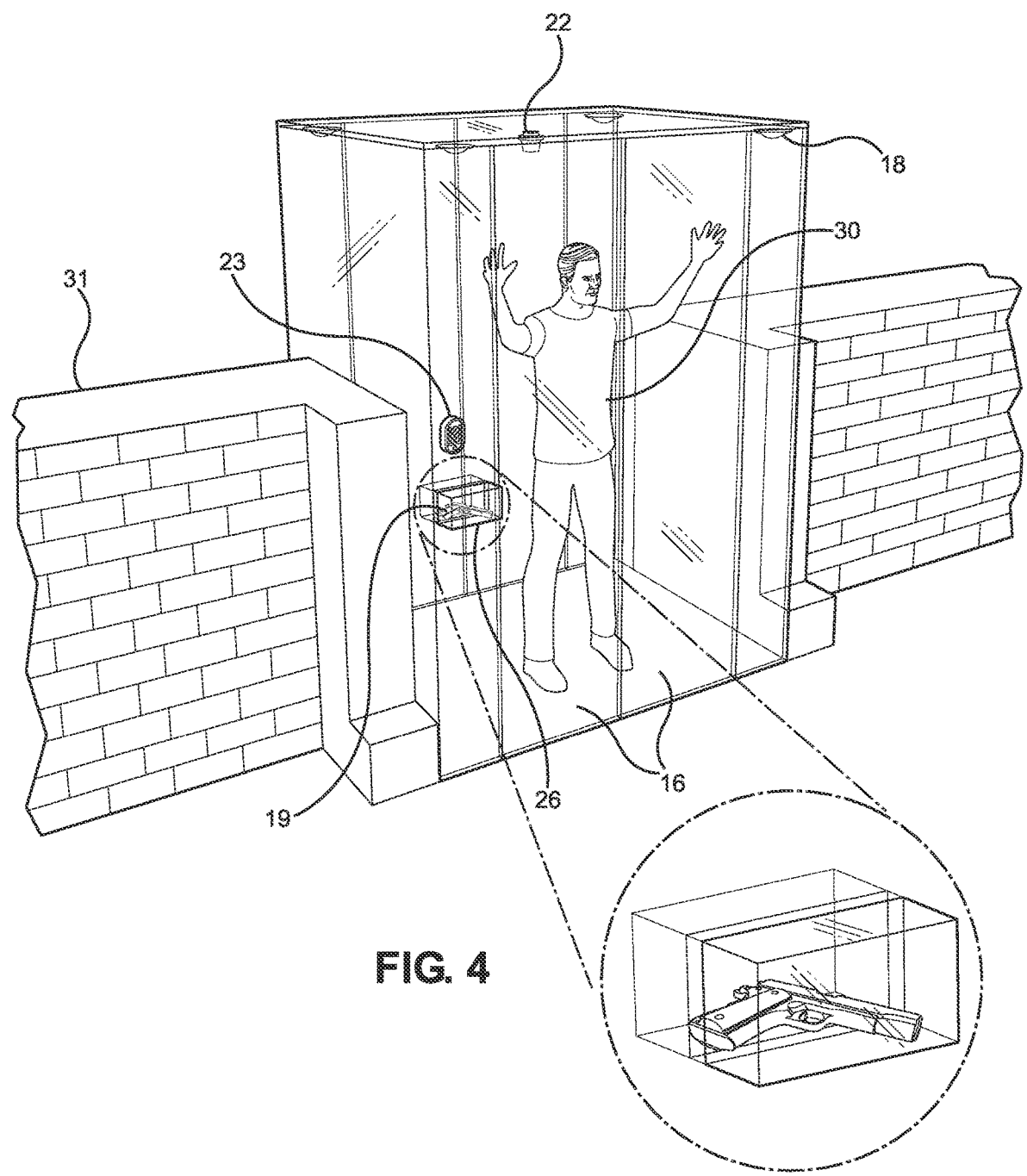
FIG. 4 shows a perspective view of an embodiment of the threat detection and isolation system in use.

Referring now to FIG. 4, there is shown a perspective view of an embodiment of the threat detection and isolation system in use. In one use, the housing is installed within a façade 31 of an entrance to an existing building, such that the housing appears as a typical entrance to the building. Once an individual 30 enters the housing via the doors 16, the sensor 18 determines whether a dangerous object 19 is located within the housing. The dangerous object 19 can include a variety of objects, including knives, firearms, explosives, aerosols, and the like that could be utilized to inflict harm on others. Upon detection of the dangerous object 19, the doors 16 are configured to lock in a closed position, thereby confining the individual 30 within the housing. Furthermore, in the illustrated embodiment, upon detection of the dangerous object 19, the light 22 is configured to illuminate to visually alert individuals in the area to the possible threat. In some embodiments, emergency services are automatically contacted upon actuation of the sensor 18. Once local security officers or other emergency services arrive, the individual 30 may deposit the dangerous object 19 within the transfer compartment 26 to allow emergency services to disarm the individual 30. Upon disarming the individual, the lock on the door 16 can be disengaged upon entry of a verified code into the keypad 23. In this manner, a threat can be immediately detected and isolated to ensure the safety of individuals within the public location.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A threat detection and isolation system, comprising:
   a housing having an upper wall and a plurality of sidewalls extending therefrom defining an interior volume;
   wherein the housing comprises a bulletproof, transparent material;
   an entry door affixed to the housing on at least one of the plurality of sidewalls for providing access to the interior volume;
   an exit door affixed to the housing opposite the entry door for providing egress from the housing and configured to remain locked for a defined time period after the entry door is opened;
   a camera disposed within the housing capable of rendering a continuous recording;
   at least one sensor disposed within the housing, wherein the sensor is configured to detect the presence of a predefined dangerous object within the interior volume; and
   a transfer compartment disposed within one of the plurality of sidewalls wherein the transfer compartment includes an interior door and an exterior door providing access to an interior of the transfer compartment, wherein the interior and exterior doors are pivotally affixed to a lower edge of the respective sidewall and are spring biased toward a closed position; and
   whereupon detection of the presence of the predefined dangerous object, the exit door remains in or moves to a closed position and a lock is configured to engage the exit door, thereby preventing the exit door from moving to an open position.

2. The threat detection and isolation system of claim 1, further comprising a speaker configured to emit an audible alert upon actuation of the sensor.

3. The threat detection and isolation system of claim 1, further comprising a light disposed on the upper wall, the light configured to illuminate upon actuation of the sensor.

4. The threat detection and isolation system of claim 1, further comprising a keypad on an exterior of the housing, wherein the keypad is configured to disengage the lock upon entry of a code.

5. The threat detection and isolation system of claim 1, wherein the at least one sensor comprises a metal detector.

6. The threat detection and isolation system of claim 1, wherein the at least one sensor comprises a chemical sensor.

7. The threat detection and isolation system of claim 1, wherein a sensor of the at least one sensor is disposed in each corner of the upper wall.

8. A threat detection and isolation system, comprising:
   a housing having an upper wall and a plurality of sidewalls extending therefrom defining an interior volume;
   wherein the housing comprises a bulletproof, transparent material;
   an entry door affixed to the housing on at least one of the plurality of sidewalls for providing access to the interior volume;
   an exit door affixed to the housing opposite the entry door for providing egress from the housing and configured to remain locked for a defined time period after the entry door is opened;
   a camera disposed within the housing capable of rendering a continuous recording;
   at least one sensor disposed within the housing, wherein the sensor is configured to detect the presence of a predefined dangerous object within the interior volume; and
   a transfer compartment disposed within one of the plurality of sidewalls wherein the transfer compartment includes an interior door and an exterior door providing access to an interior of the transfer compartment, wherein the interior and exterior doors are pivotally affixed to a lower edge of the respective sidewall and are spring biased toward a closed position; and
   whereupon detection of the presence of the predefined dangerous object:
      the entry and exit doors remains in or moves to a closed position and a lock is configured to engage the entry and exit doors, thereby preventing the entry and exit doors from moving to an open position; and
      a notification is sent to emergency services via a wireless communication system disposed within the housing.

9. The threat detection and isolation system of claim 8, further comprising a speaker configured to emit an audible alert upon actuation of the sensor.

10. The threat detection and isolation system of claim 8, further comprising a light disposed on the upper wall, the light configured to illuminate upon actuation of the sensor.

11. The threat detection and isolation system of claim 8, further comprising a keypad on an exterior of the housing, wherein the keypad is configured to disengage the lock upon entry of a code.

12. The threat detection and isolation system of claim 8, wherein the at least one sensor comprises a metal detector.

13. The threat detection and isolation system of claim 8, wherein the at least one sensor comprises a chemical sensor.

14. The threat detection and isolation system of claim 8, wherein a sensor of the at least one sensor is disposed in each corner of the upper wall.

\* \* \* \* \*